United States Patent
Plona et al.

(10) Patent No.: US 6,328,311 B1
(45) Date of Patent: Dec. 11, 2001

(54) DUAL-CONTACT BRUSH SEAL

(75) Inventors: Daniel Georges Plona, Vulaines sur Seine; Monique Andrée Thore, Crosnes, both of (FR)

(73) Assignee: Societe Nationale d'Etude et de Construction de Moteurs d'Aviation "Snecma", Paris (FR)

( * ) Notice: Subject to any disclaimer, the term of this patent is extended or adjusted under 35 U.S.C. 154(b) by 0 days.

(21) Appl. No.: 09/453,511

(22) Filed: Dec. 3, 1999

(30) Foreign Application Priority Data

Dec. 10, 1998 (FR) .................................................. 98 15572

(51) Int. Cl.[7] .................................................. F16J 15/447
(52) U.S. Cl. .............................................................. 277/355
(58) Field of Search .............................................. 277/355

(56) References Cited

U.S. PATENT DOCUMENTS

| | | | |
|---|---|---|---|
| 885,032 | * 4/1908 | Ferranti | ................................. 277/355 |
| 5,066,024 | * 11/1991 | Reisinger et al. | .................... 277/355 |
| 5,114,159 | * 5/1992 | Baird et al. | ........................... 277/355 |
| 5,794,938 | * 8/1998 | Hofner et al. | ........................ 277/355 |

FOREIGN PATENT DOCUMENTS

| | | |
|---|---|---|
| 0 211 275 | 2/1987 | (EP) . |
| 2 607 893 | 6/1988 | (FR) . |

* cited by examiner

Primary Examiner—Lynne H. Browne
Assistant Examiner—E. Peavey
(74) Attorney, Agent, or Firm—Oblon, Spivak, McClelland, Maier & Neustadt, P.C.

(57) ABSTRACT

A single flexible strip of strands or brush fibers is contained within a body constituted by an inner crown and an outer crown. The crowns are U-shaped such that they can be used to position the two ends of the flexible strip against an outer surface of revolving shaft. Preferably, the arms of the two crowns are of different lengths and face each other.

5 Claims, 4 Drawing Sheets

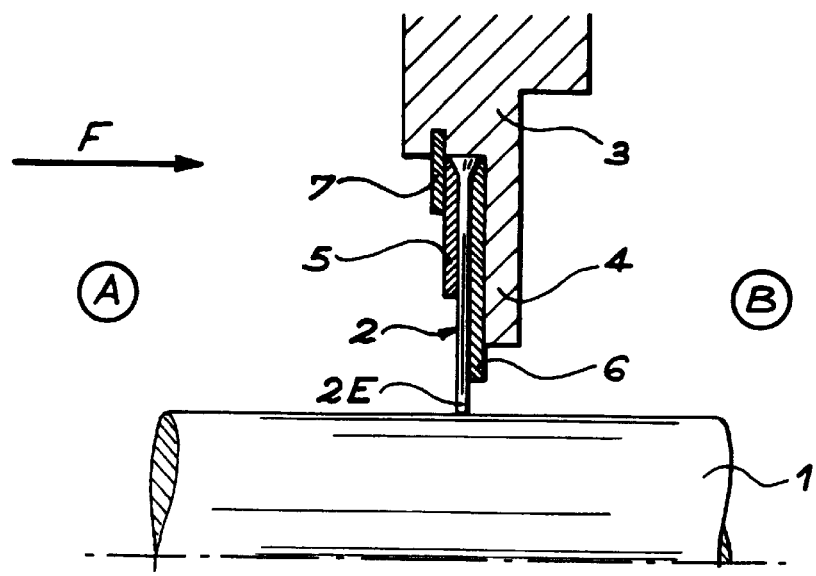
PRIOR ART FIG. 1
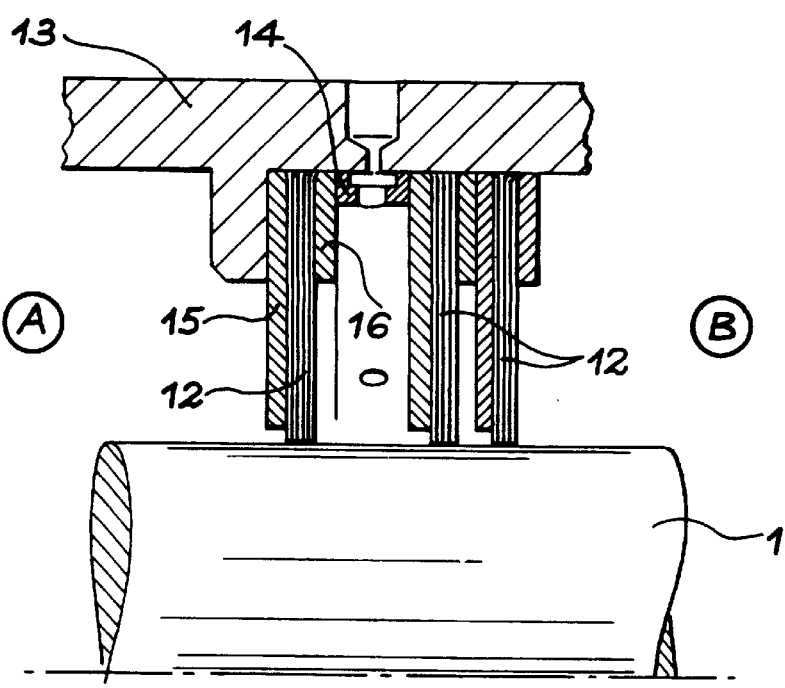
PRIOR ART FIG. 2

DUAL-CONTACT BRUSH SEAL

FIELD OF THE INVENTION

The present invention relates to the leaktightness between two chambers or volumes that are subjected to different pressures and located around an axis or a revolving shaft. The invention particularly relates to aeronautical turbine engines that very often use the type of leaktight seal called a brush seal.

DISCUSSION OF THE BACKGROUND

Brush seals are bundles of wires, fibers or strands that can be metal, organic or synthetic. The material is chosen according to the environmental and operational conditions of the brush seal, i.e. according to the type of fluids to be kept leaktight, the temperatures and pressures present on either side of the seal.

Referring to FIG. 1, a joint of this type is used to separate two volumes or two chambers A and B that surround a revolving shaft 1. Preferably, the bundle of wires 2 is positioned radially relative to revolving shaft 1 and the end 2E of the bundle of wires touches the outer surface of revolving shaft 1. The bundle of wires 2 is fitted into a fixed support 3 that constitutes the seal support. If we consider the direction of air that flows through the seal and that is indicated by arrow F, an upstream ring 5 is preferably used that is located upstream of bundle of wires 2 and that is positioned using a fastening ring 7, said fastening ring being fastened in seal support 3. A downstream ring 6 is also used, said ring being fastened downstream of bundle of wires 2 and positioned to bear against a rib 4 of seal support 3. It should be noted that the inner diameter of downstream ring 6 is smaller than that of upstream ring 5. In other words, the bundle of wires 2 is born over a greater distance by the downstream ring than by upstream ring 5. End 2E of bundle 2 has a certain degree of freedom, particularly on the upstream end i.e. of the upstream ring 5. The seal thus separates two zones in which different pressures may be present.

Referring to FIG. 2, French patent application 2 607 893 discloses a brush seal that comprises several bundles, and more particularly three bundles in the example shown. The three bundles of wires 12 are fastened perpendicularly to revolving shaft 1 in relation to which they are used to separate several zones, particularly upstream zone A and downstream zone B that are positioned on either side of the assembly of three bundles of wires 12. The bundles of wires 12 are held by upstream ring 15 and downstream ring 16 and are positioned relative to a seal support 13 using a rib 14 of said seal support.

The technical detail of all these types of brush seals are well known. On the other hand, it is not always easy to produce high quality brush seals.

Brush seals can also be positioned axially, for example in semi-static applications or to equip a slaved axial seal. In this event, it is impossible to implement the standard techniques used in the design of metal radial seals.

SUMMARY OF THE INVENTION

The aim of this invention is to propose a design of axial brush seals with a double leaktight wall. This design can also be applied to radial seals even though they may be more complicated to assemble.

In order to achieve this aim, the invention mainly relates to an axial or radial dual-contact brush seal to ensure leaktightness between two chambers subjected to different pressures and positioned around a shaft that is either revolving or fixed, comprising the following:

- two flexible leaktight bundles that are parallel to each other and each end of which is in contact with the surface of the revolving or fixed shaft; and
- a support body in which the two flexible leaktight bundles are fastened.

According to a main characteristic of the invention the two flexible leaktight bundles are constituted by a single, flexible, U-shaped strip the central section of which is fastened in the support body.

In the preferred embodiment the support body comprises two crowns: an inner crown and an outer crown, both of which are U-shaped and overlap each other.

Preferably, the arms of the two U-shaped crowns are not the same length such that the end of each leaktight bundle is only in contact with a single crown.

Preferably, in the event of a radial application, polarizing means are used to ensure the two crowns are assembled in the correct direction.

LIST OF FIGURES

The invention and its various technical characteristics will be better understood from the following detailed description. The description refers to the attached figures where:

FIG. 1, described above, is a cross section of a first type of brush seal of the prior art;

FIG. 2, described above, is a cross section of a second type of brush seal of the prior art;

DETAILED DESCRIPTION OF THE TWO EMBODIMENTS OF THE INVENTION

Figure 3:
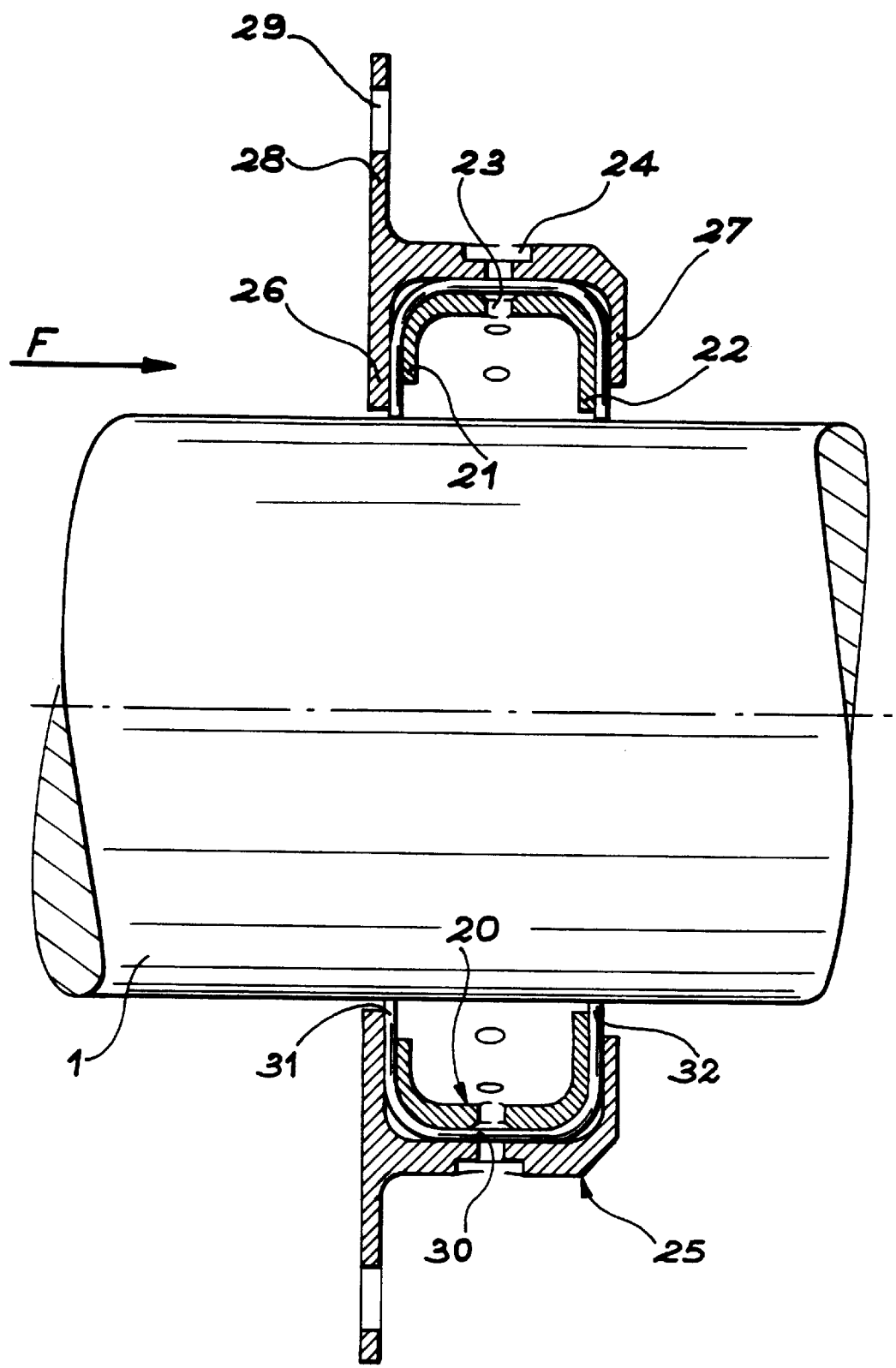
FIG. 3 is a cross section of a first radial embodiment of the brush seal according to the invention.

The brush seal of the invention will now be considered, referring to FIG. 3, in a first radial embodiment that is assembled around a revolving shaft 1. The brush seal comprises two main parts that are an inner crown 20 and an outer crown 25. Besides the fact that inner crown 20 and outer crown 25 are both circular, in other words they surround revolving shaft 1, they both have U-shaped cross sections. Inner crown 20 is positioned inside outer crown 25. The two arms 21 and 22 of inner crown 20 are of different lengths, as are the two arms 26 and 27 of outer crown 25.

Moreover, if arrow F is considered in an aeronautical turbine engine, upstream arm 26 of outer crown 25 is longer than downstream arm 27 of said outer crown. Contrarily, upstream arm 21 of inner crown 20 is shorter than downstream arm 22 of said inner crown. Due to this each end 31 and 32 of flexible strip 30, that constitutes the two leaktight bundles of the seal, is only in contact with a single surface of a crown, either inner crown 20 or outer crown 25. Therefore upstream end 31 of flexible strip 30 is in contact with upstream end 26 of outer crown 25 and downstream end 32 of flexible strip 30 is in contact with the outer surface of downstream end 22 of flexible strip 30 have a relatively high degree of freedom of movement, particularly downstream. It should be noted that the longest ends, i.e. upstream end 26 of the outer crown and downstream end 22 of inner crown 20, are relatively close to revolving shaft 1 in order to restrict the freedom of movement of ends 31 and 32 in the upstream section of the flexible strip. In other words, the long sections or long arms 22 and 26 of inner crown 20 and outer crown 25 are positioned facing each other to guide the strands or the fibers that constitute the brush of the flexible strip as close as possible to the zone that is in contact with the surface of the revolving shaft.

Outer crown 25 is fitted with an arm 28 which in turn is provided with a fastening hole 29 intended to fasten the seal in a turbine engine that is to be fitted with the brush seal. Similarly, fastening means are provided between inner crown 20 and outer crown 25 using fastening holes 23 and 24. Inner crown 20 and outer crown 25 may also be fastened by welding, riveting or by being slotted into the turbine engine.

Figure 4:
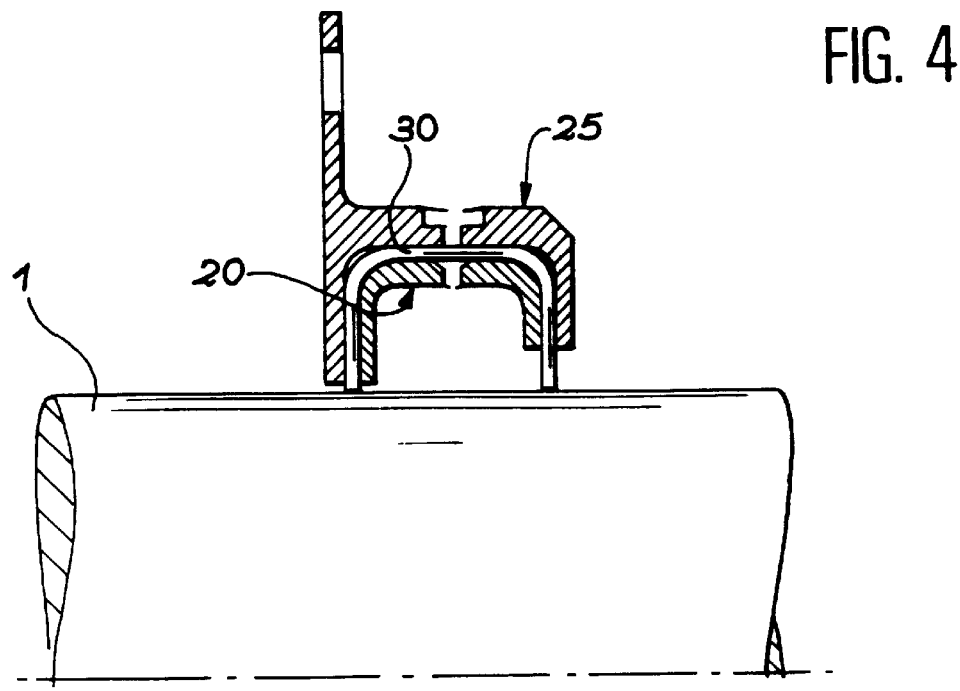
FIG. 4 is a cross section of defective assembly that should be avoided when the brush seal of the invention is produced.

Inner crown 20 and outer crown 25 should be fitted with foolproofing means to assist the operator in polarizing said crowns during assembly. When the crowns are assembled the arms of equal length of inner crown 20 and outer crown 25 could be located on the same side of the seal if careless handling occurs, as shown in FIG. 4 in which outer crown 25 is reversed compared to the assembly in FIG. 3. In this event the brush seal would clearly provide a lower performance level from the first time it is used. Foolproofing means of this kind could be constituted by a centering slug fastened on one of the two crowns and a matching hole provided in the other crown, these two components not being located in the median plane between inner crown 20 and outer crown 25. To ensure the brush seal is assembled in a certain direction, the central section of inner crown 20 and outer crown 25 could also be conical.

Figure 5:
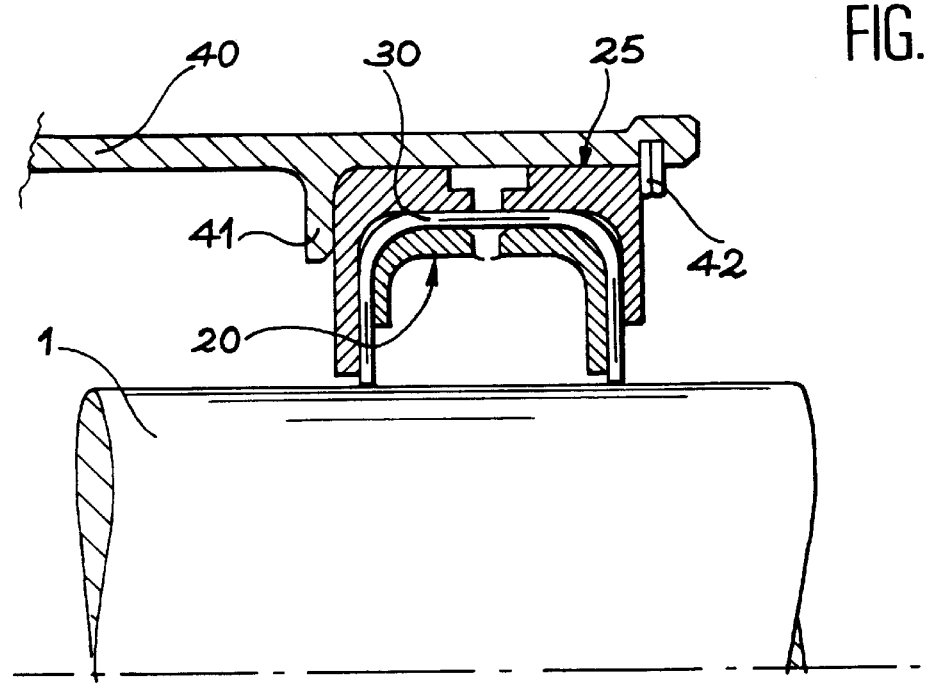
FIG. 5 is a second radial embodiment of the brush seal according to the invention.

Referring to FIG. 5, a second radial embodiment of the brush seal according to the invention is assembled using a slightly different method. In this example a support 40 is used that is concentric with revolving shaft 1. The concentric support has an upstream positioning rib 41 against which outer crown 25 is positioned. The downstream end of said outer crown is fastened using an elastic ring 42 such that it may be positioned axially relative to revolving shaft 1. Apart from this assembly characteristic, the characteristics and constitution of the seal, i.e. flexible strip 30, inner crown 20 and outer crown 25, can be identical to those described in FIG. 3.

Figure 6:
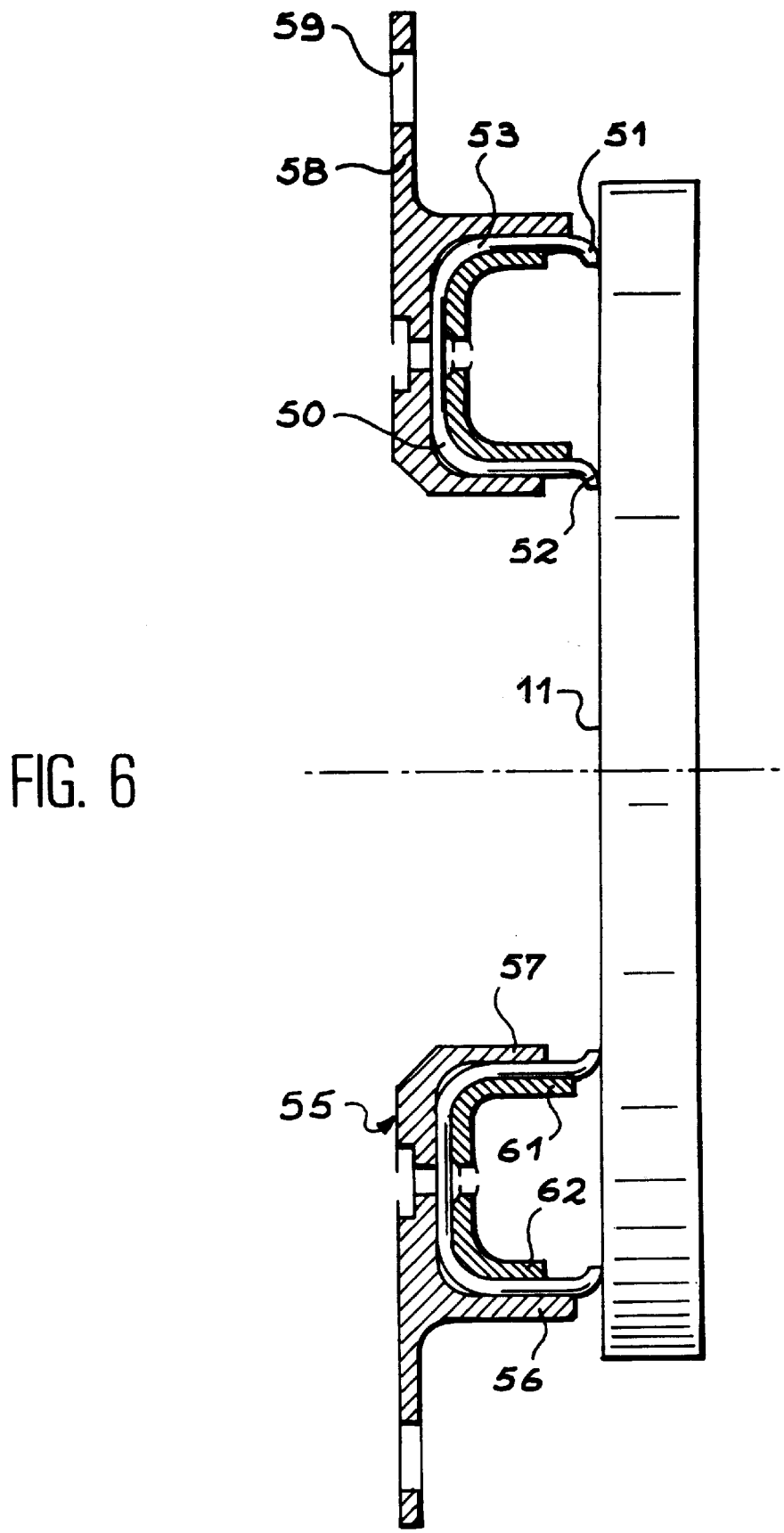
FIG. 6 is a third axial embodiment of the brush seal according to the invention.

FIG. 6 shows an axial-type seal according to the invention. In this figure the seal is pressed against the radial surface 11 of a revolving part, such as a plate or the end surface of a wide shaft. The seal also comprises a U-shaped flexible strip 53 that is held in place by an inner crown 50 and an outer crown 55. These two crowns 50 and 55 have ends 56, 57, 61 and 62 of different lengths in pairs for the same reasons as those given for the radial seal. A fastening hole 59 is provided in an arm 58 to fasten the seal.

The main advantages of the brush seal according to the invention are that it may be radial, as described in FIGS. 4 and 5, but that it may also be axial as described in FIG. 6.

Production and assembly of the brush seal are clearly simplified, particularly for assembling the inner and outer crowns for the axial-type seal.

What is claimed is:

1. An axial or radial dual-contact brush seal to ensure leaktightness between two chambers subjected to different pressures and that are positioned around one of a shaft, that is either revolving or fixed, and a plate comprising the following:

two separate flexible leaktight bundles that are parallel to each other and which have ends which are separated from one another in one of an axial direction of the shaft and a radial direction of the plate and are respectively in contact with one of an outer surface and a surface of the plate in a radial direction of the plate; and a support body in which the two flexible leaktight bundles are fastened, wherein the two flexible leaktight bundles each comprise a single, flexible, U-shaped strip having a central section which is fastened in the support body.

2. Dual-contact brush seal of claim 1 wherein the support body comprises an inner crown and an outer crown, each of said inner crown and said outer crown being U-shaped and overlapping each other, said inner crown separating said ends of said bundles from one another.

3. Dual-contact brush seal of claim 2 wherein the arms of the inner and outer crowns are not of the same length such that the end of each leaktight bundle is only in contact with a single crown.

4. Dual-contact brush seal of one of claims 2 and 3, the seal comprising a radial seal and which comprises polarizing means for ensuring that the crowns are assembled in a correct direction.

5. The dual-contact brush seal of one of claims 2 and 3, said seal comprising a radial and which comprises a polarizing device for ensuring that the two crowns are assembled in a correct direction.

* * * * *